US 6,601,895 B1

(12) United States Patent
Tannenbaum et al.

(10) Patent No.: US 6,601,895 B1
(45) Date of Patent: Aug. 5, 2003

(54) SEMITRAILER PULLOUT ACCESSORY

(75) Inventors: L. Robert Tannenbaum, Chicago, IL (US); Joshua Tannenbaum, Chicago, IL (US); Andres Barales, Countryside, IL (US)

(73) Assignee: AAPEX Trailers, Inc., Chicago, IL (US)

( * ) Notice: Subject to any disclaimer, the term of this patent is extended or adjusted under 35 U.S.C. 154(b) by 0 days.

(21) Appl. No.: 10/134,930

(22) Filed: Apr. 29, 2002

Related U.S. Application Data
(60) Provisional application No. 60/363,998, filed on Mar. 14, 2002.

(51) Int. Cl.[7] .................................................. B60P 3/34
(52) U.S. Cl. .................................................. 296/26.09
(58) Field of Search ....................... D12/406; 296/26.08, 296/26.09; 414/522; 293/119

(56) References Cited

U.S. PATENT DOCUMENTS 3,588,160 A * 6/1971 Reiner ........................ 293/119
4,409,903 A * 10/1983 Wilhelmsson et al. ...... 414/522

FOREIGN PATENT DOCUMENTS

DE   1002641   *  2/1957   ............... 296/26.09
FR   1077493   * 11/1954   ............... 296/26.09

OTHER PUBLICATIONS

Popular Mechanics, May 1986, "Fast photo service".*

* cited by examiner

Primary Examiner—Dennis H. Pedder
(74) Attorney, Agent, or Firm—Michael Best & Friedrich LLC

(57) ABSTRACT

The invention provides a pullout for carrying goods behind a semitrailer, which extends at approximately the same elevation as the cargo floor of the semitrailer. When the improved pullout is in a closed position, it is concealed by a decorative panel that presents an attractive, finished appearance. The rear turn signal lights and brake lights of the semitrailer are mounted in openings in the panel. The panel serves to partially enclose and protect the semitrailer's lights and associated wiring. The panel also provides a protected storage space for a support chain. A crash guard extends rearward from a housing for the new pullout so as to protect the electrical wiring and structural members of the semitrailer in the event of a collision.

13 Claims, 5 Drawing Sheets

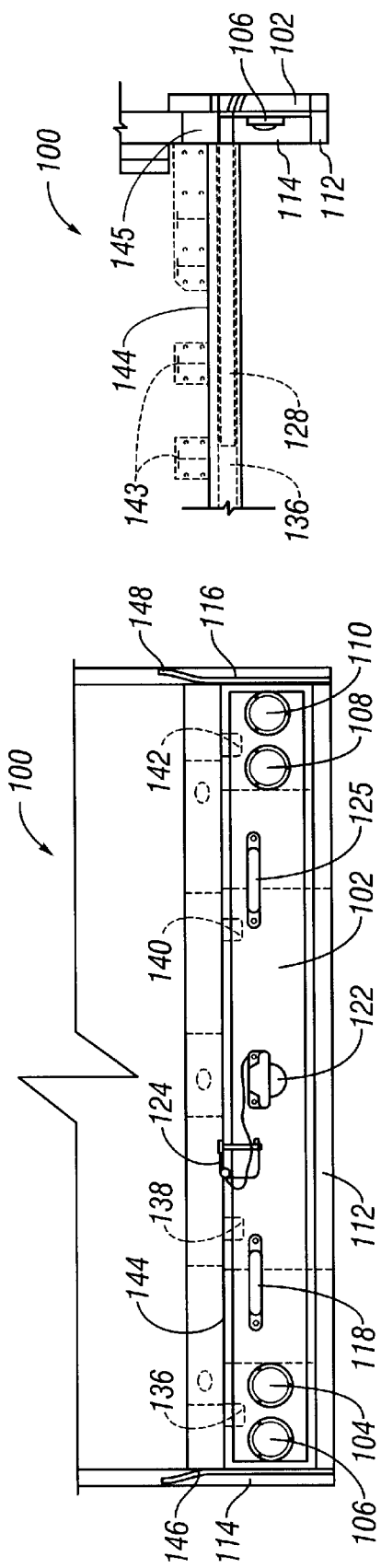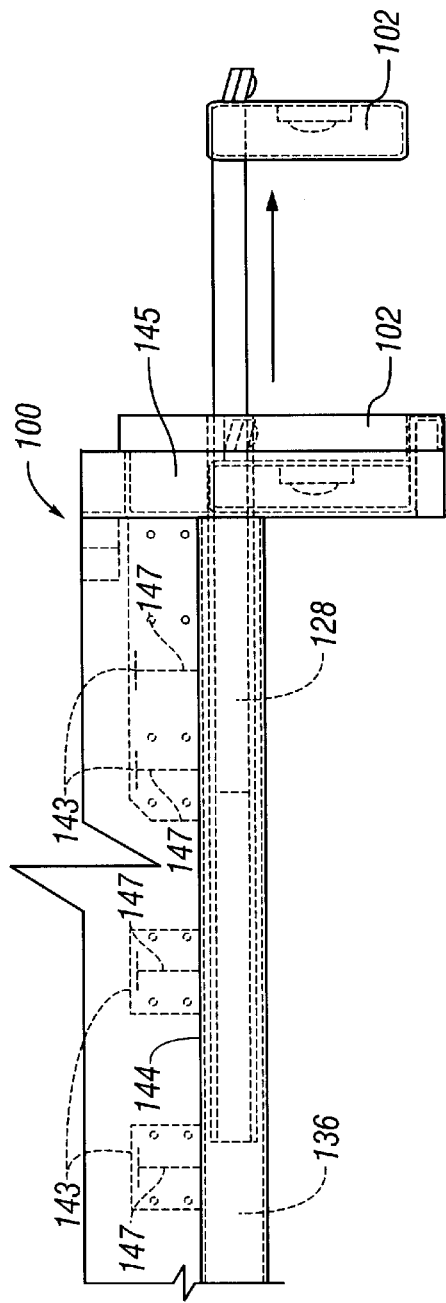
FIG. 6
FIG. 7
FIG. 8

SEMITRAILER PULLOUT ACCESSORY

Applicants claim the benefit under Title 35 U.S.C.§119(e) of provisional application Ser. No. 60/363,998 filed Mar. 14, 2002.

TECHINICAL OF THE INVENTION

This invention relates to semitrailers suitable for combination in a tractor-trailer assembly used in trucking. More specifically, the invention relates to a pullout accessory for moving goods behind a semi-trailer.

BACKGROUND OF THE INVENTION

Some of the largest tractor-trailer combinations on our nation's highways are, for example, interstate furniture moving vans. These tractor-trailers are typically capable of moving all of the furniture for an entire family home in a single load. These tractor-trailers include semi-trailers, which are constructed relatively low to the road with a relatively long, flat cargo bed, for accommodating a large volume of cargo. The rear ends of these semi-trailers are commonly no more than 21 inches from the ground. Consequently, they normally require no under-ride protection for the safety of passenger vehicles that may be following the trailer.

Despite this large cargo capacity, there are times when it would be convenient if the moving van had an even greater cargo capacity. For example, a load might include more furniture than the semitrailer can safely contain within the conventional storage area. As another example, a load might include furniture that completely fills the semitrailer and, also, a motorcycle. For these situations, "pullouts" have been used in the past.

Generally speaking, these previously disclosed pullouts are extendable shelves that ride in a closed position beneath the rear end of a moving van until needed. When extended to an open position, these pullouts are typically capable of supporting several hundred pounds of additional cargo, beyond what is carried inside the semitrailer. Support chains leading to the semitrailer are sometimes used to strengthen the pullouts.

These prior art pullouts are usually located at a level substantially below the level of the semitrailer's cargo floor, often below the tail lights of the semitrailer. As a result, these pullouts are not always satisfactory for supporting cargo that rests mainly on the cargo floor, but extends rearwardly beyond the floor. These pullouts also offer little protection for the semitrailer's structural members or electrical wiring from road salt and weather conditions and tend to detract from the overall appearance of the semitrailer.

A need exists for an improved pullout for moving cargo behind semitrailers, which extends at approximately the same elevation as the cargo floor. Preferably, the improved pullout protects the semitrailer's tail light wiring from the weather and road salt, and shields its structural members from the effects of a rear-end collision. Preferably, the improved pullout has an attractive appearance and can be stored out of sight when not in use.

SUMMARY OF THE INVENTION

The invention provides a pullout for carrying goods behind a semitrailer, which extends at approximately the same elevation as the cargo floor of the semitrailer. When the improved pullout is in a closed position, it is concealed by a decorative panel that presents an attractive, finished appearance. The rear turn signal lights and brake lights of the semitrailer are mounted in openings in the panel. The panel serves to partially enclose and protect the semitrailer's lights and associated wiring. The panel also provides a protected storage space for a support chain. A crash guard extends rearward from a housing for the new pullout so as to protect the electrical wiring and structural members of the semitrailer in the event of a collision.

Preferably, the pullout includes a plurality of generally parallel tubes or channels suspended lengthwise beneath the cargo bed of a transport vehicle. The rear ends of the cargo bed tubes are substantially surrounded by a housing, which includes a horizontal rear sill and vertical side pieces that are attached to a structural member in the cargo bed.

Tubes or channels of a slightly smaller diameter or width are inserted into the cargo bed tubes to produce a sliding fit. The back ends of the sliding channels are fixed to a generally vertical panel or closeout, which defines openings for mounting the tail lights of the semitrailer. Handles, wiring for the tail lights, a retaining pin and an electrical connection are mounted on the panel. The tail light wiring is connected to the semitrailer's electrical system by lengths of resilient, flexible wiring.

When the pullout is positioned in its "closed" position, it appears to merely decorative. When the pullout is extended four or five feet to the rear, in its "open" position, the pullout provides a useful platform for carrying cargo behind the semitrailer. The pullout may be strengthened by use of support chains running from the panel to support rings on the semitrailer. The housing may be strengthened by the addition of crash guards, which extend rearward from the housing and shield the semitrailer in the event of a collision with another vehicle.

BRIEF DESCRIPTION OF THE DRAWINGS

FIG. 6 is an end view of a pullout in accordance with the invention;

FIG. 7 is a side view of the pullout depicted in FIG. 6 in closed position;

FIG. 8 is a side view of the pullout depicted in FIG. 6, illustrating open and closed positions;

DETAILED DESCRIPTION OF PREFERRED EMBODIMENTS

Figure 1:
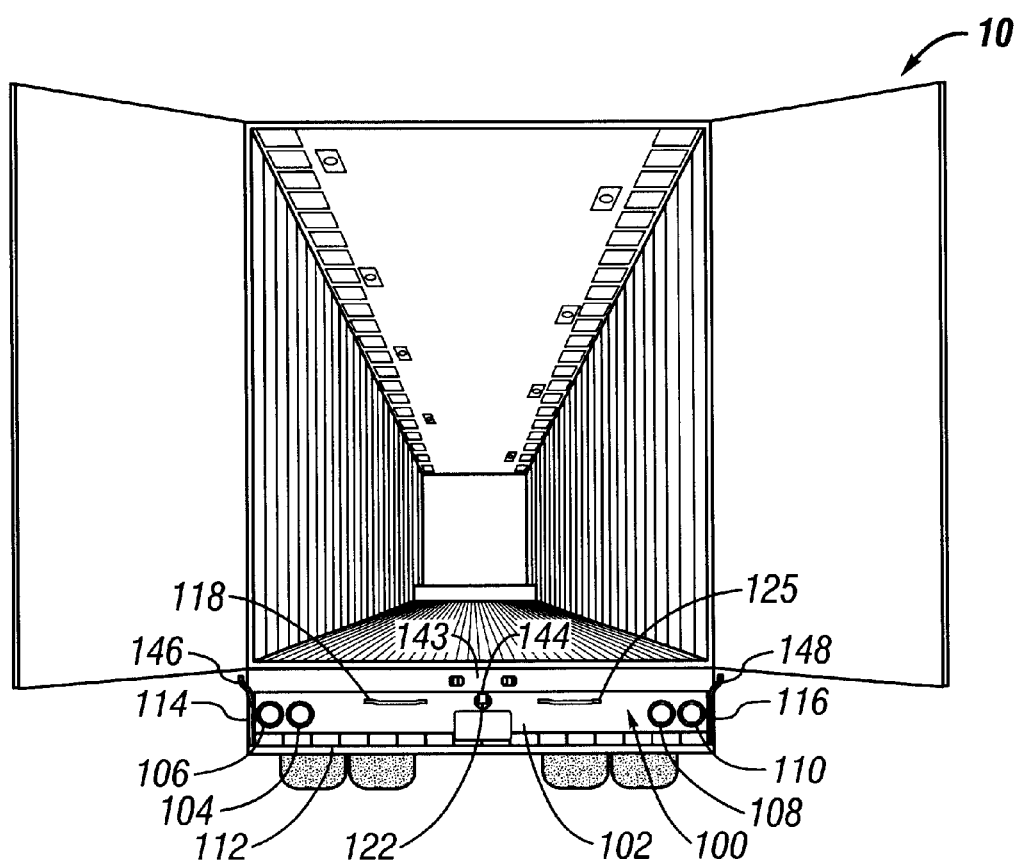
FIG. 1 is a perspective view of a pullout in accordance with the invention in closed position.

The invention provides a semitrailer 10 equipped with pullout 100, as depicted in closed position in FIG. 1. Pullout 100 includes a vertical member or closeout panel 102. The tail lights of the semitrailer, including rear turn signal lights 106 and 110 and brake lights 104 and 108, are mounted on panel 102. The tail lights are visible through openings located in panel 102. Handles 118 and 125 for extending and retracting pullout 100 are mounted on the rear face of panel 102. Wiring connection 122 and security pin 120 are also attached to panel 102.

Semitrailer 10 includes a load bearing cargo bed 143, which is formed by structural members 145 and 147 (best seen in FIG. 8) and defines bottom face 144. Side pieces 114 and 116 depend from structural member 145 (best seen in FIG. 12) of cargo bed 143, and are joined by cross piece 112 to form a housing which surrounds panel 102. This housing and the rear face of panel 102 cooperate to present a finished and attractive appearance, in keeping with modem semitrailer design.

Figure 2:
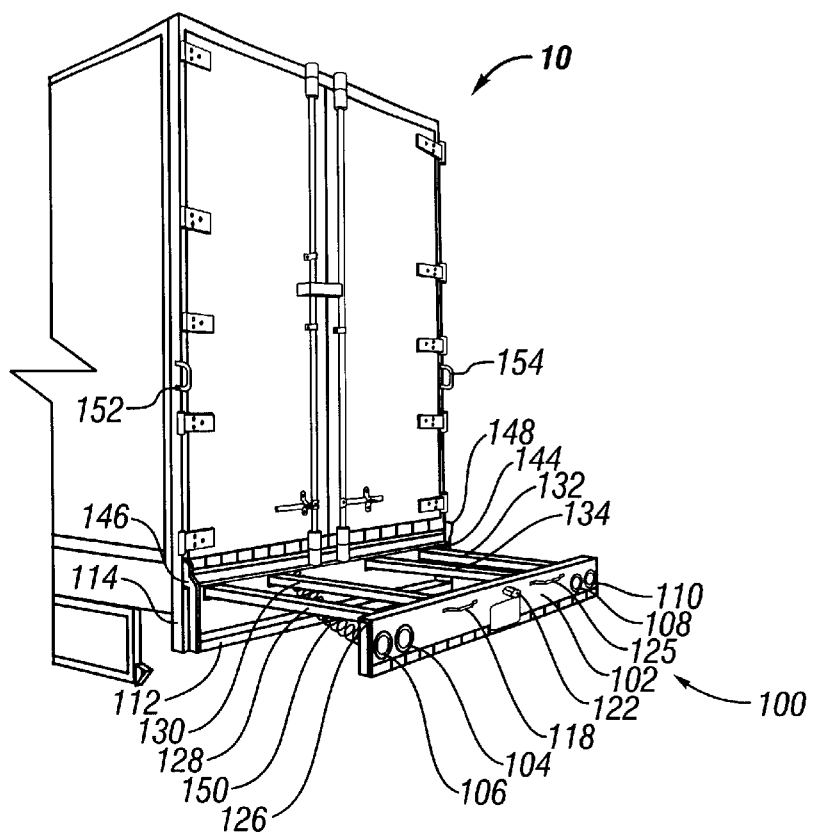
FIG. 2 is a perspective view of the pullout depicted in FIG. 1 in open position.

Referring now to FIG. 2, which depicts pullout 100 in an open position, it can be seen that panel 102 is a C-shaped channel supported at its upper side by angle iron 126. Four square movable members or sliding channels 128, 130, 132, and 134 extend from semitrailer 10 and are attached to support angle iron 126. Flexible electrical wiring 150 runs from semitrailer 10 to panel 102, and delivers electrical current to signal lights 106 and 110 and tail lights 104 and 108. Sliding channels 128, 130, 132, 134 are located in a position which will not interfere with tail lights 104, 108 during normal operation of semi-trailer 10. Fastening rings 152 and 154, best seen in FIG. 2, extend from the rear corners of semitrailer 10.

Figure 3:
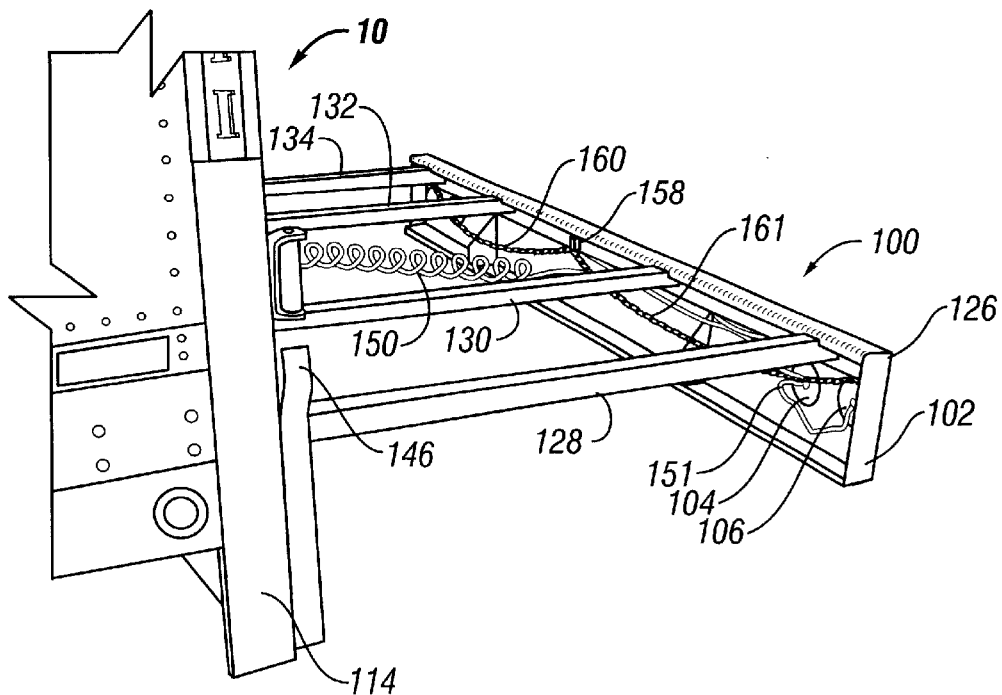
FIG. 3 is another perspective view of the pullout depicted in FIG. 1 in open position.

Turning now to FIG. 3, chains, ropes or cables 160 and 161 are each attached at one end to angle iron 126. This attachment can be permanent. When not in use, the free ends of chain 160 and 161 are suspended from centrally located hook, ring or other suitable attachment member 158, which is connected to angle iron 126. Alternatively, in order to carry relatively heavy loads on pullout 100, the free ends of chains 160 and 161 are disengaged from attachment member 158 and secured to rings, hooks or other suitable attachment members 152 and 154, as seen in FIG. 2. With chains 160 and 161 in the carrying position, several hundred pounds of cargo may be carried safely and conveniently on pullout 100.

FIG. 3 also shows the manner in which flexible electrical wiring 150 extends from semitrailer 10. Flexible wiring 150 receives electrical power and signals from semitrailer 10, and delivers power and signals, through local wiring 151, to the tail lights located in front of panel 102. Wiring 150 is flexible and resilient, so as to extend when pullout 10 is extended and retract when pullout 100 is closed. Panel 102 partially surrounds and protects electrical wiring 150 and 151 from road salt and the weather in both the closed and open positions.

Crash guards 146 and 148 are best seen in FIGS. 3 and 6. Crash guards 146 and 148 are attached to side pieces 114 and 116, respectively, and extend rearward. Crash pieces 146 and 148 shield and protect turn signals 106 and 110 and brake lights 104 and 108 in the event of a rear end collision with another vehicle.

Figure 4:
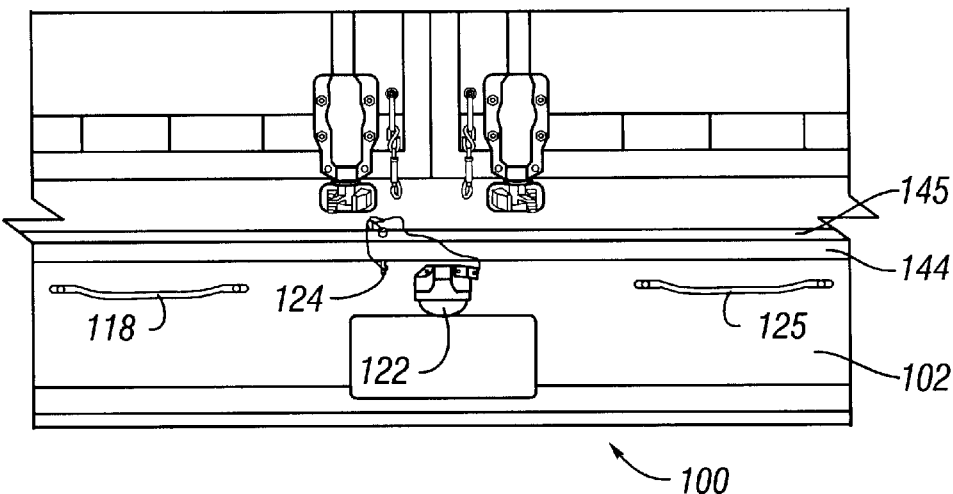
FIG. 4 is a close-up perspective view of the pullout depicted in FIG. 1.

FIG. 4 is a close-up view of pullout 100 in the closed position. Electrical connection 122 provides access to the wiring system for signal lights 106 and 110 and brake lights 104 and 108. Retaining pin 124 is attached to a safety spring, which is secured by a flexible cable fixed to electrical connection 122. FIG. 4 also illustrates the locations of bottom plane 144 of cargo bed 143 and structural member 145, which is the rearmost structural member of cargo bed 143. Retaining pin 124 passes through a hole or receptacle (not shown) in structural member 145, to retain pullout 100 in closed position when semitrailer 100 is moving, for example, on the open road.

In order to convert pullout 100 from closed position as depicted in FIG. 4, to open position as depicted in FIG. 2, the operator bends the safety spring of retaining pin 122 and removes retaining pin 124 from the receptacle in structural member 145. The operator then grasps handles 118 and 125 and draws pullout 100 away from cargo bed 143. For example, pullout 100 may extend about four to about five feet from cargo bed 143. Subsequently, the free ends of chains 160 and 161 are disengaged from attachment member 158 and fastened to attachment member 152 and 154, respectively. A chest of drawers or a motorcycle, for example, may be carried on pullout 100 with chains 160 and 161 in carrying position.

Figure 5:
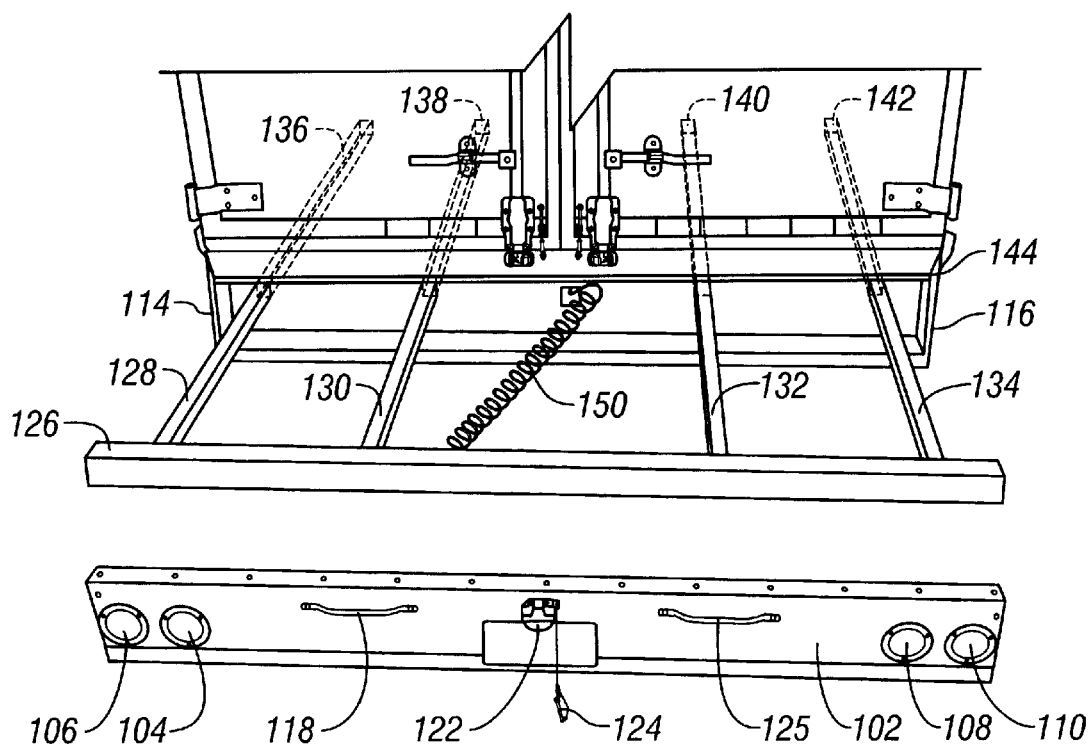
FIG. 5 is an exploded perspective view of a pullout in accordance with the invention.

FIG. 5 is a partial exploded view illustrating the manner in which parallel moveable members or sliding channels 128, 130, 132 and 134 mate with parallel fixed members or fixed channels 136, 138, 140 and 142, respectively. Structural members 147 (best seen in FIG. 8) of cargo bed 143 are rigidly attached to the upper sides of fixed channels 128, 130, 132 and 134 to suspend fixed channels 128, 130, 132 and 134 lengthwise beneath the bottom plane 144 of cargo bed 143. Sliding square shaped channels 128, 130, 132 and 134 are slightly narrower than, and nest within, each of the respective fixed channels 136, 138, 140 and 142 to create a sliding fit. However, when a load is placed upon pullout 100 in open position, significant friction is generated which locks pullout 100 in open position until the load is removed.

Sliding channels 128, 130, 132 and 134 are rigidly attached to angle iron 126. Angle iron may be, for example, 2 inches by 3 inches by ¼ inch thick and approximately 8 feet long. Panel 102 is a C-channel having, for example, a depth of 3 inches, a height of 12 inches and a length of 8 feet. Panel 102 is ⅛ of an inch thick and, preferably, composed of stainless steel.

FIGS. 6, 7 and 8 depict the manner in which sliding channel 128 is extended from fixed channel 136, as pullout 100 is converted from closed to open position. FIG. 6 shows an end view of pullout 100, with fixed channel 136 in hidden view and indicated by dotted lines. FIG. 7 is a partial side view of pullout 100, as depicted in FIG. 6. FIG. 8 is an enlarged view of FIG. 7, depicting the relationship of fixed channel 136 to sliding channel 128 and panel 102 in open position, and indicating in phantom lines the closed position of sliding channel 128 and panel 102.

Figure 9:
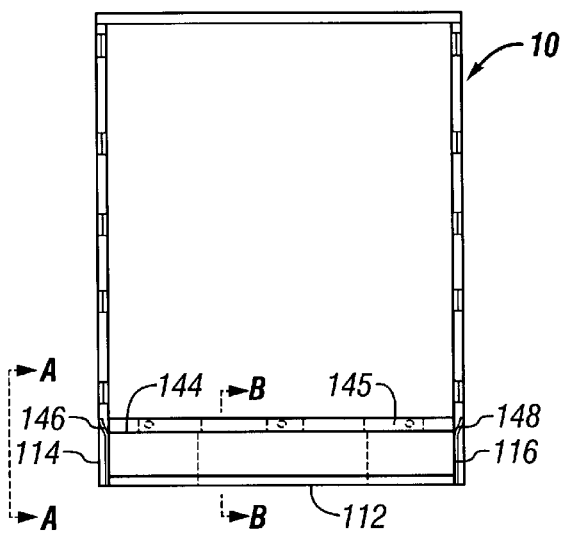
FIG. 9 is an end view of a semitrailer adapted to accept a pullout in accordance with the invention.
Figure 10:
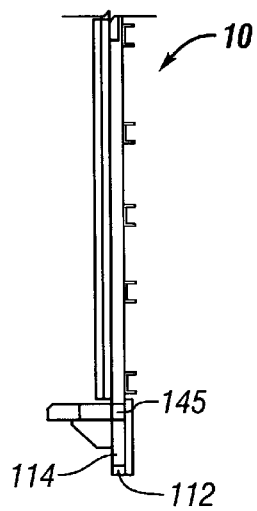
FIG. 10 is a partial side view of the semitrailer depicted in FIG. 9.

FIGS. 9 through 14 illustrate the manner in which the housing for panel 102 is assembled. FIG. 9 shows structural member 145 of cargo bed 143, side pieces 114 and 116, and cross piece 112 cooperating to form a housing or border. FIG. 10 is a side elevation view illustrating the relationship of side piece 114 and cross piece 112 to semitrailer 10.

Figure 11:
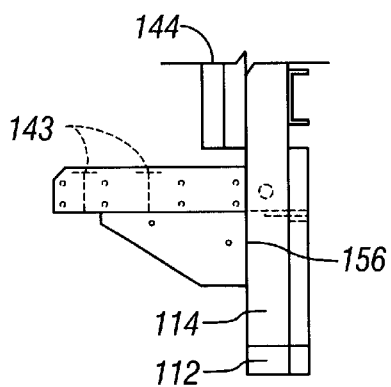
FIG. 11 is a close-up partial side view of the semitrailer depicted in FIG. 9, taken along Section A—A of FIG. 9.
Figure 12:
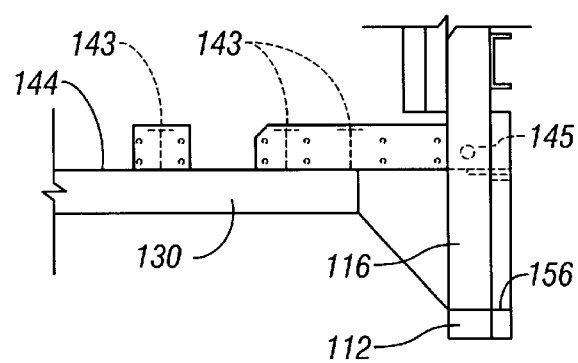
FIG. 12 is a partial sectional view of the semitrailer depicted in FIG. 9 taken along Section B—B of FIG. 9.
Figure 13:
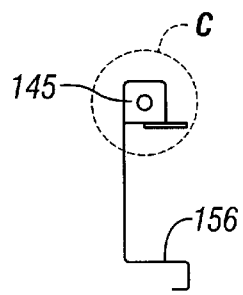
FIG. 13 is a side view depicting a rear sill.
Figure 14:
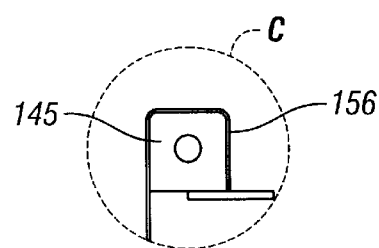
FIG. 14 is an enlarged view of the area in Circle C of FIG. 13.

FIG. 11 is a sectional view taken along plane A—A in FIG. 9. FIGS. 11 through 14 reveal that rear sill 156 wraps around and is supported from above by structural member 145, and wraps around and is supported from below by cross piece 112. In the closed position, panel 102 of pullout 100 slides into the cavity defined by rear sill 156. FIG. 12 is a partial sectional view, taken along plane B—B in FIG. 9. FIGS. 13 and 14 are close-up side views of rear sill 156, showing structural member 145 in cross-section.

As described above, the invention provides a pullout for carrying additional cargo on approximately the same level as the associated semitrailer's cargo bed. This pullout provides useful support for articles that are placed on the floor of the cargo bed and extend beyond the normally closed position of the semitrailer doors.

Pullouts in accordance with the invention may be installed in new semitrailers, or added as an after-market accessory to existing semitrailers. Once installed, they tend to protect and prolong the useful life of the semitrailer. These pullouts are also convenient to use and attractive.

While fixed and sliding channels of square cross-sections are disclosed above, other cooperating members can be used to form the pullout. These include tubes, rails, bearings, wheels and channels with other cross-sections, and any other structures that would provide the same functional features of the disclosed channels.

While only a few embodiments of the invention have been described above, those of ordinary skill in the art will recognize that these embodiments may be modified and altered without departing from the spirit and scope of the invention. The embodiments described above are to be considered in all respects as illustrative and not restrictive.

What is claimed is:

1. A pullout for carrying goods behind a semi-trailer comprising:

a plurality of generally horizontal sliding channels moveably attached to the semi-trailer, and having an open position and a closed position;

a generally vertical member attached to the rearward end of at least one of the sliding channels;

at least two side pieces depending from the rear of the semi-trailer; and a general horizontal structural member and a generally horizontal cross piece, each attached to and cooperating with the side pieces to define a border that substantially surrounds the vertical member when the sliding channels are in the closed position.

2. The pullout of claim 1 in which a crash guard is mounted on and extends rearwardly of at least one of the side pieces.

3. The pullout of claim 1 wherein when the channels are in a closed position, the vertical member is approximately flush with the border and conceals the sliding channels from view as seen from behind the semi-trailer.

4. The pullout of claim 1 in which the vertical member includes at least one opening for at least one brake light of the semi-trailer.

5. The pullout of claim 1 in which the vertical member includes at least one opening for at least one signal light of the semi-trailer.

6. The pullout of claim 1 in which wiring extends from the semi-trailer to the vertical member for delivering electrical current to a brake light or a signal light mounted on the vertical member.

7. The pullout of claim 1 which includes a first attachment member mounted on the semi-trailer, and a support chain which is attached to the vertical member and can be removably fastened to the first attachment member.

8. The pullout of claim 7 which includes a second attachment member mounted on the vertical member to hold the chain when the sliding channels are in the closed position.

9. The pullout of claim 1 in which the vertical member includes a lock for retaining the vertical member and sliding channels in the closed position.

10. The pullout of claim 1 in which the pullout in the open position extends about four to about five feet rearwardly of the cross piece.

11. The pullout of claim 1 in which the sliding channels are located in a position which will not interfere with the brake lights of the semi-trailer during normal operation of the semi-trailer.

12. The pullout of claim 1 wherein the semi-trailer includes a cargo bed and fixed channels which are attached to the semi-trailer adjacent the cargo bed and wherein the sliding channels are of slightly smaller width or diameter, as compared to the fixed channels and nest within the fixed channels when the sliding channels are in the closed position.

13. The pullout claim 1 which the width of the pullout is slightly less than the width of the semi-trailer and the cross piece is no more than about 21 inches above the ground during normal operation.

* * * * *